United States Patent
Erikson et al.

(10) Patent No.: US 11,923,713 B2
(45) Date of Patent: Mar. 5, 2024

(54) SYSTEMS AND METHODS FOR VEHICLE-TO-LOAD CHARGING

(71) Applicant: Rivian IP Holdings, LLC, Plymouth, MI (US)

(72) Inventors: Tyler Erikson, Torrance, CA (US); Steven Schulz, Torrance, CA (US); Kyle Underhill, Los Angeles, CA (US); Silva Hiti, Redondo Beach, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 318 days.

(21) Appl. No.: 17/161,996

(22) Filed: Jan. 29, 2021

(65) Prior Publication Data

US 2022/0247185 A1    Aug. 4, 2022

(51) Int. Cl.
*H02J 7/00* (2006.01)
*B60R 16/02* (2006.01)

(52) U.S. Cl.
CPC .............. *H02J 7/007* (2013.01); *B60R 16/02* (2013.01); *H02J 7/0042* (2013.01)

(58) Field of Classification Search
CPC . B60R 16/00; B60R 16/02; H02J 7/00; B60L 53/00; B60L 58/00
See application file for complete search history.

(56) References Cited

U.S. PATENT DOCUMENTS

| | | | | |
|---|---|---|---|---|
| 9,260,024 | B1 * | 2/2016 | Lau | B60L 53/66 |
| 11,235,675 | B2 * | 2/2022 | Choi | H04W 4/46 |
| 2019/0217732 | A1 * | 7/2019 | Zhou | B60L 50/60 |
| 2022/0289051 | A1 * | 9/2022 | Huang | H01R 13/70 |

* cited by examiner

Primary Examiner — Richard Isla
Assistant Examiner — Sadia Kousar
(74) Attorney, Agent, or Firm — Foley & Lardner LLP

(57) ABSTRACT

Various disclosed embodiments include illustrative apparatuses and methods for performing vehicle-to-vehicle and/or vehicle-to-load charging. In an illustrative embodiment, an apparatus includes a multi-function DC power unit and an interface unit configured to perform battery recharging between a donor battery-powered device and a receiver battery-powered device. The interface unit is configured to removably receive the multi-function DC power unit.

16 Claims, 5 Drawing Sheets

SYSTEMS AND METHODS FOR VEHICLE-TO-LOAD CHARGING

INTRODUCTION

The present disclosure relates to electric vehicle battery systems. The statements in this section merely provide background information related to the present disclosure and may not constitute prior art.

For vehicle-to-vehicle (V2V) or vehicle-to-load charging, a power electronics device may be used as an interface between two vehicles or between a vehicle and a load, such as a home battery system, a general battery-powered device (load), the electrical grid, etc. The power electronics device takes energy from the batteries of one vehicle and provides it to the batteries of the other vehicle or to a load. In order to start the energy transfer process, the power electronics device needs to be powered to begin communication with the donor or recipient vehicles or loads in order to start the charging process.

Typically, the power electronics device used for V2V or vehicle-to-load charging would be powered by its own internal battery. However, batteries for this use have a limited shelf life.

BRIEF SUMMARY

Various disclosed embodiments include illustrative apparatuses and methods for performing vehicle-to-vehicle and/or vehicle-to-load charging.

In an illustrative embodiment, an apparatus includes a multi-function DC power unit and an interface unit configured to perform battery recharging between a donor battery-powered device and a receiver battery-powered device. The interface unit is configured to removably receive the multi-function DC power unit.

In another illustrative embodiment, an apparatus includes a DC power unit and an interface unit configured to perform battery recharging between a donor battery-powered device and a receiver battery-powered device. The interface unit is configured to removably receive the DC power unit.

In another illustrative embodiment, a method includes inserting a multi-function DC power device into a vehicle-to-load recharging unit, connecting the vehicle-to-load recharging unit to a donor vehicle and a recipient load, converting voltage from the multi-function DC power device to an operational voltage, and supplying the converted voltage to a controller of the vehicle-to-load recharging unit.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Illustrative embodiments are illustrated in referenced figures of the drawings. It is intended that the embodiments and figures disclosed herein are to be considered illustrative rather than restrictive.

Like reference symbols in the various drawings generally indicate like elements.

DETAILED DESCRIPTION

Figure 1:
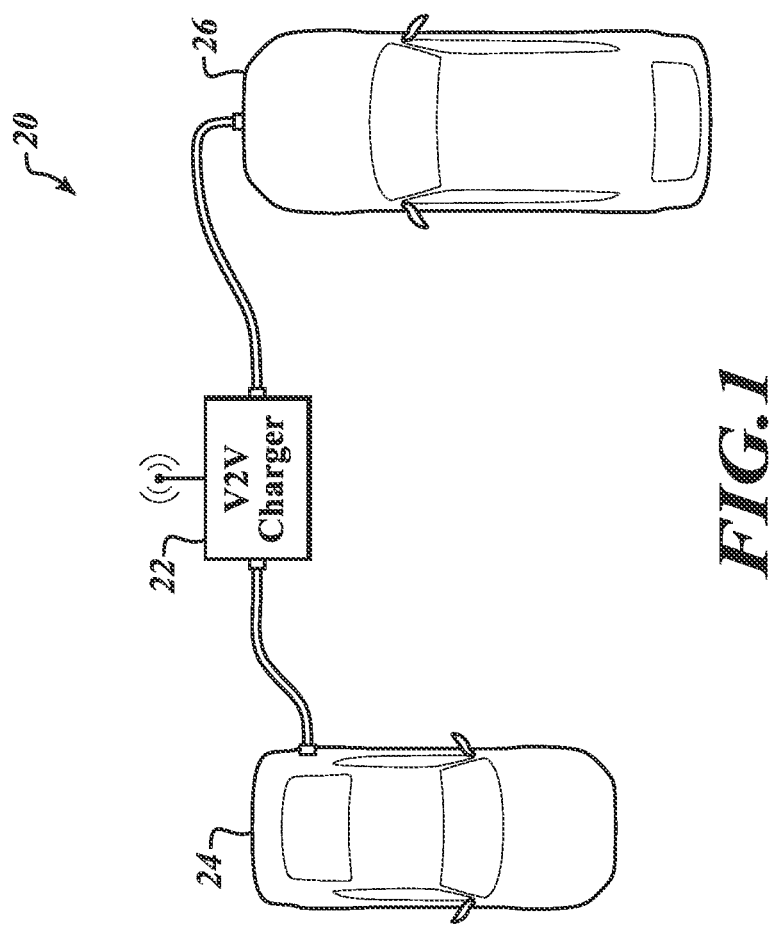
FIG. 1 is a schematic diagram of a donor vehicle used to charge a recipient vehicle via an illustrative charger interface.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Various disclosed embodiments include illustrative apparatuses and methods for performing vehicle-to-vehicle and/or vehicle-to-load charging. In some such embodiments, illustrative apparatuses and methods may be provided for pre-heating vehicle batteries in colder environments.

Referring now to FIG. 1 and given by way of overview, in various embodiments an illustrative vehicle-to-vehicle (V2V) and/or vehicle-to-load recharging system 20 includes a charging device 22 that receives the DC voltage provided by a donor electrically rechargeable vehicle 24 and converts the received DC voltage into a charging voltage that is sent to a recipient electrically rechargeable vehicle or other load 26.

In the interest of brevity and simplicity, references made herein to vehicle-to-vehicle ("V2V") applications will be understood to include vehicle-to-load applications in addition to V2V applications. It will also be appreciated that references herein to a load as a "vehicle" also include other non-vehicle loads. For example, such loads may include a house, individual loads, the grid (including selling electricity back to the grid), and the like. It will be appreciated that limitation to such examples is not intended and is not to be inferred. As such, no limitation to a vehicle or to any individual load is intended and is not to be inferred.

Figure 2:
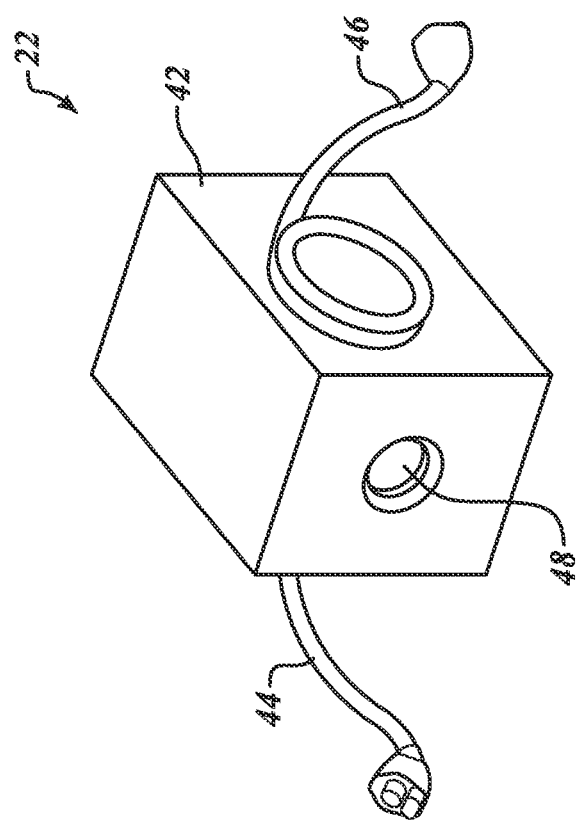
FIG. 2 is a perspective view of an illustrative charger interface device.

Referring additionally to FIG. 2, the V2V charging device 22 includes a housing 42, a donor vehicle connector 44, a recipient vehicle connector 46, and an auxiliary power device port 48. The housing 42 includes electronics for converting DC voltage received from the donor vehicle 24 via the donor vehicle connector 44 into an output charging voltage for the recipient vehicle 26 via the recipient vehicle connector 46. The auxiliary power device port 48 includes electrical leads for connecting an auxiliary power device to the electronics within the housing 42.

Figure 4:
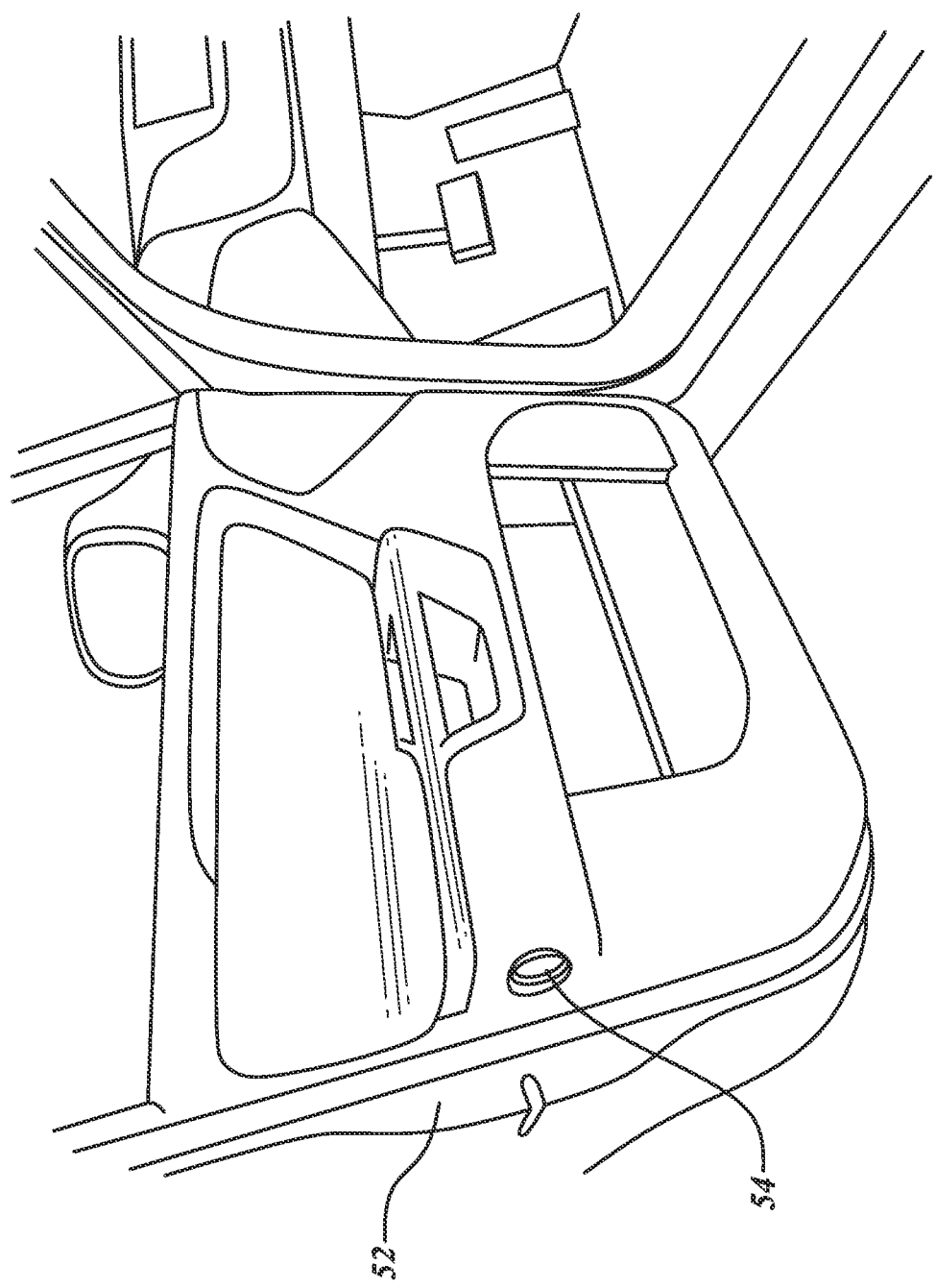
FIG. 4 is a perspective view of a donor or recipient vehicle door with components for charging the auxiliary power source of FIG. 3.
Figure 3:
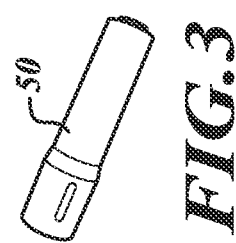
FIG. 3 is a perspective view of an illustrative auxiliary power source.

Referring additionally to FIGS. 3 and 4, an illustrative auxiliary power device 50 (multi-purpose DC power unit/device) is sized to be received by the auxiliary power device port 48 of the V2V charging device 22. Prior to use within the V2V charging device 22, the auxiliary power device 50 is stored in a recharging port 54 in a door 52 of the donor vehicle 24 or the recipient vehicle 26. The recharging port 54 includes leads that will connect to leads of the auxiliary power device 50. The recharging port 54 is connected to a recharging circuit (not shown) within the vehicles 24 or 26.

It will be appreciated that the recharging port 54 may be located anywhere on either of the vehicles 24 and/or 26.

In various embodiments, the auxiliary power device 50 may include a flashlight. However, it will be appreciated that the auxiliary power device 50 may be any rechargeable device whatsoever as desired for a particular application, such as without limitation a rechargeable battery pack, a radio, an emergency beacon device, etc. In other words, the auxiliary power device 50 may be a multi-function DC power unit or a single-function DC power unit like a rechargeable battery. The auxiliary power device 50 includes a rechargeable battery, a load, such as a light producing device (LED, lightbulb), a circuit for connecting the rechargeable battery to the load, and a circuit for connecting the rechargeable battery to electrical leads within the recharging port 54 and the auxiliary power device port 48.

Figure 5:
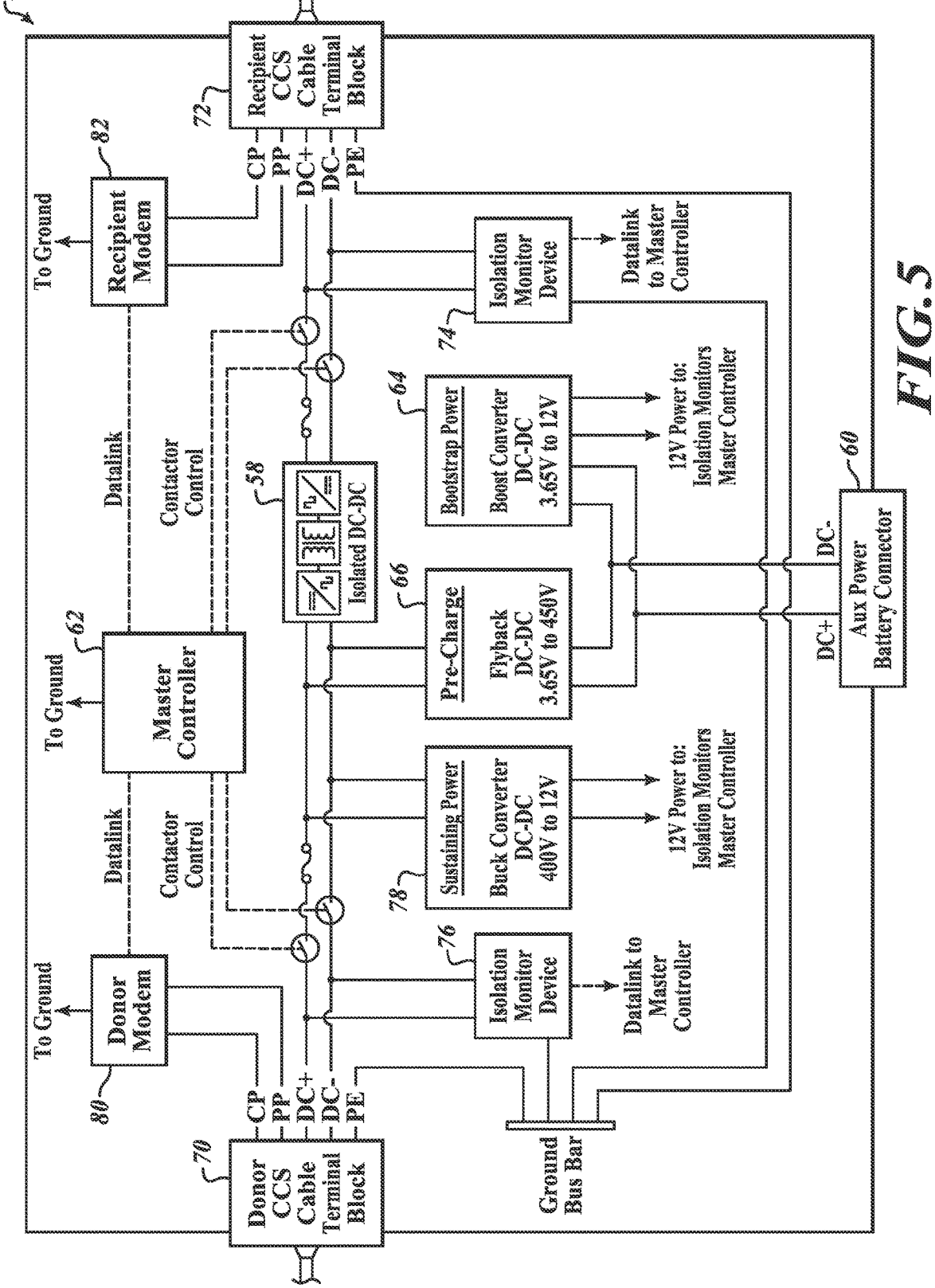
FIG. 5 is a schematic diagram of components of the illustrative charger interface device shown in FIG. 1.

Referring additionally to FIG. 5, the V2V charging device 22 includes donor and recipient vehicle cable connector ports 70 and 72, respectively, an auxiliary power device connector 60, a bootstrap power circuit 64, a pre-charge circuit 66, a master controller 62, a donor vehicle communication device 80, a recipient vehicle communication device 82, isolation monitoring devices 74 and 76, and a DC-to-DC power electronics circuit 58. Once the auxiliary power device 50 is attached to the auxiliary power device connector 60 and the donor and recipient vehicles are connected to the V2V charging device 22 via the ports 70 and 72, the voltage supplied by the auxiliary power device 50 charges initial startup components (e.g., the master controller 62, the isolation monitoring devices 74 and 76, the donor vehicle communication device 80, the recipient vehicle communication device 82) of the V2V charging device 22 via the bootstrap power circuit 64. For example, the auxiliary power device 50 provides an approximately 4V (in some embodiments, 3.65V) DC voltage to the bootstrap power circuit 64 and the pre-charge circuit 66. A diode (not shown) may be included between the auxiliary power device connector 60 and the bootstrap power circuit 64 and the pre-charge circuit 66 so current only flows into the V2V charging device 22. The bootstrap power circuit 64 creates a 12V operational voltage from the voltage of auxiliary power device 50. The pre-charge circuit 66 creates a pre-charge voltage of around 400V from the voltage of auxiliary power device 50.

Figure 6:
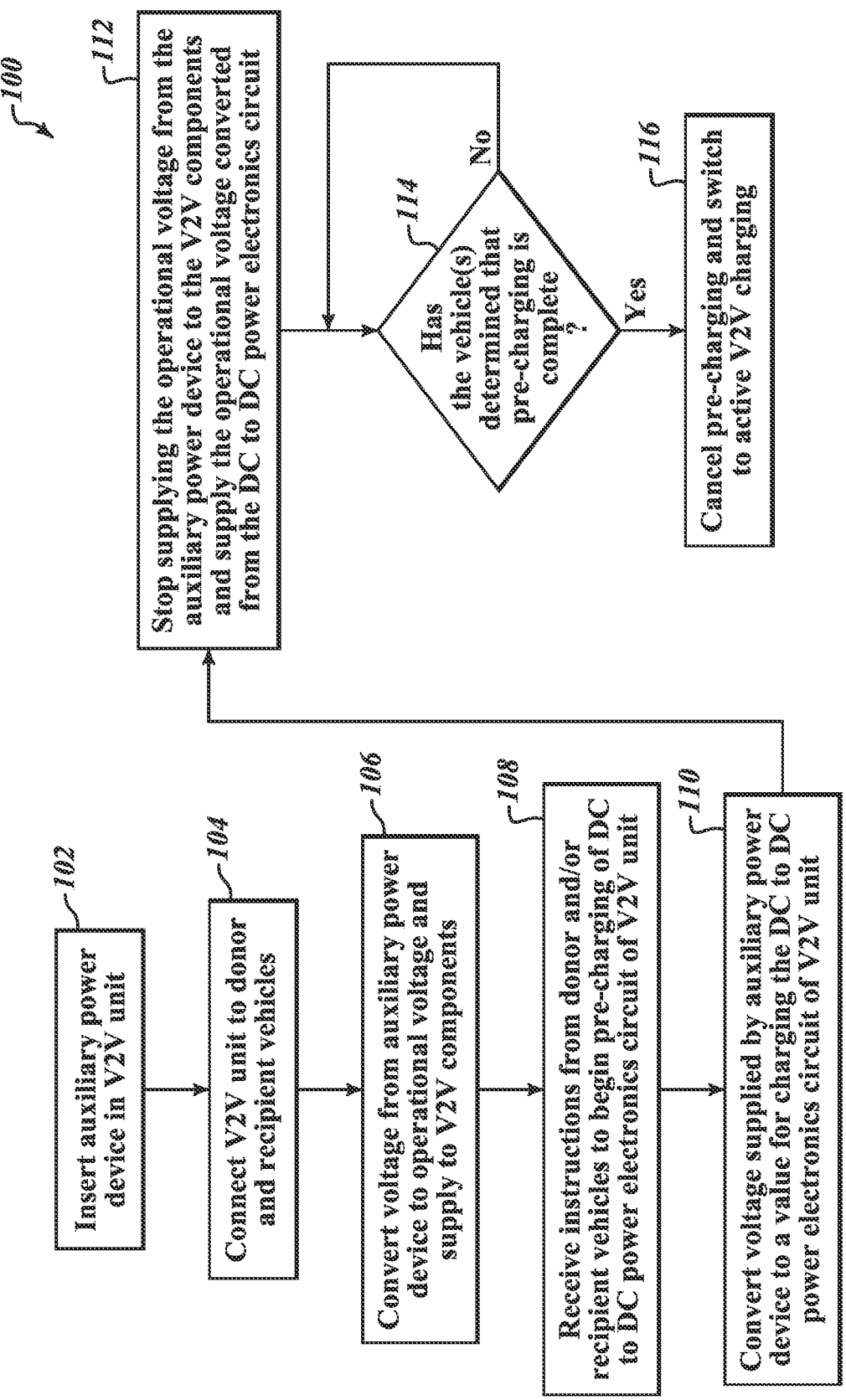
FIG. 6 is a flow diagram of an illustrative process performed by the system of FIG. 1.

The bootstrap power circuit 64 converts a voltage output by the auxiliary power device 50 to a voltage value acceptable by the initial startup components of the V2V charging device 22. After the initial startup components have been sufficiently powered, the master controller 62 instructs the pre-charge circuit 66 to convert voltage from the auxiliary power device 50 to a value for preparing the DC-to-DC power electronic circuit 58. The donor vehicle 24 may provide instructions to the master controller 62 via the communication devices 80 and 82 to activate the pre-charge circuit 66. Then the donor vehicle 24 determines whether the DC-to-DC power electronic circuit 58 has a voltage at an acceptable level for performing active V2V charging. The donor vehicle 24 sends this determination to the master controller 62 via the communication devices 80 and 82, whereby the vehicle contactors are closed. After the donor vehicle 24 closes its contactors, the V2V charging device closes its output contactors to the recipient vehicle 26 and uses it power electronic circuit to buck or boost the supply voltage to the precharge voltage requested by the recipient vehicle 26. Then the recipient vehicle 26 determines whether the DC-to-DC power electronic circuit 58 has a voltage at an acceptable level for performing active V2V charging. The recipient vehicle 26 sends this determination to the master controller 62 via the communication devices 80 and 82, whereby the master controller 62 stops the pre-charging and begins direct DC-to-DC charging Referring additionally to FIG. 6, an illustrative process 100 suitably may be used by the V2V charging device 22. At a block 102, the auxiliary power device 50 is inserted into the V2V charging device 22. At a block 104, the V2V charging device 22 is connected to the donor vehicle 24 and the recipient vehicle 26. At a block 106, voltage from the auxiliary power device 50 is converted into an operational voltage that is then supplied to various components of the V2V charging device 22. At a block 108, after the components of the V2V charging device 22 have sufficiently received the operation voltage, the master controller 62 instructs circuit components to start pre-charging.

The system precharges the donor DC bus first and then the donor EV closes its contactors, next the system precharges the recipient vehicles DC bus until voltages match, once the voltages match the recipient vehicle closes its contactors and charging begins.

The pre-charging causes the current voltage supplied by the auxiliary power device 50 to be converted to a value for charging the DC-to-DC power electronic circuit 58. Also, the operational voltage sent from the auxiliary power device 50 is stopped and is generated by the DC-to-DC power electronic circuit 58. At a decision block 114, the master controller 62 determines whether the pre-charging is complete based on communications received from the donor or recipient vehicles 24 or 26, respectively. If the pre-charging has been determined to be complete, then at a block 116 the pre-charging is canceled and the V2V charging device 22 is switched to actively charging the recipient vehicle 26 with DC voltage supplied by the donor vehicle 24.

In some embodiments, and given by way of overview the auxiliary power device 50 may include a DC outlet of the donor vehicle 24 that may connect via a cable to the charging device 22. In some other embodiments, the auxiliary power device 50 may include a DC crank generator that may connect via a cable to the charging device 22. In some other embodiments, the auxiliary power device 50 may include a solar cell that may connect via a cable to the charging device 22.

From the foregoing discussion and associated drawing figures, it will be appreciated that various embodiments have been disclosed and illustrated. To that end and without any implication of any limitation (which is not to be inferred), the following paragraphs set forth non-limiting summaries of various embodiments disclosed herein by way of example only and not of limitation:

A. An apparatus comprising: a multi-function DC power unit; and an interface unit configured to perform battery recharging between a donor battery-powered device and a receiver battery-powered device, the interface unit being configured to removably receive the multi-function DC power unit.

B. The apparatus of A, wherein the multi-function DC power unit is configured to be rechargeable.

C. The apparatus of B, wherein the multi-function DC power unit is further configured to be received within and receive a charge from a recharging component included in a device chosen from the donor battery-powered device and the receiver battery-powered device.

D. The apparatus of C, wherein the multi-function DC power unit is further configured to be handheld.

E. The apparatus of D, wherein the multi-function DC power unit includes an illumination device and a rechargeable battery.

F. The apparatus of F, wherein the interface unit includes: an auxiliary power port configured to receive the multi-function DC power unit; a first connector configured to electrically connect to the donor battery-powered device; a second connector configured to electrically connect to the receiver battery-powered device; and DC-to-DC circuit components configured to connect to the first and second connectors and the multi-function DC power unit.

G. The apparatus of F, wherein the DC-to-DC circuit components include: a controller; a donor communication device being configured to communicate with the donor battery powered device via the first connector; and a receiver communication device being configured to communicate with the receiver battery powered device via the second connector.

H. The apparatus of G, wherein the interface unit includes: a first component configured to convert a voltage supplied by the multi-function DC power unit into an operational voltage for the controller, the donor communication device and the receiver communication device; and a second component configured to convert the voltage supplied by the multi-function DC power unit into a pre-charge value for the DC-to-DC circuit components.

I. The apparatus of H, wherein the controller is configured to: receive a pre-charge signal from a device chosen from the donor battery-powered device and the receiver battery-powered device via the communication devices; and in response to receiving the pre-charge signal: command the second component to convert the voltage supplied by the multi-function DC power unit into the pre-charge value for the DC-to-DC circuit components; and command the first component to stop conversion of the voltage supplied by the multi-function DC power unit into the operational voltage.

J. An apparatus comprising: an interface unit configured to perform battery recharging between a donor battery-powered device and a receiver battery-powered device, the interface unit being configured to removably receive a DC power unit.

K. The apparatus of J, wherein the DC power unit is configured to be rechargeable.

L. The apparatus of K, wherein the DC power unit is further configured to be received within and receive a charge from a recharging component included in a device chosen from the donor battery-powered vehicle and the receiver battery-powered vehicle.

M. The apparatus of L, wherein the donor battery-powered device and the receiver battery-powered device are vehicles.

N. The apparatus of M, wherein the DC power unit includes an illumination device and a rechargeable battery.

O. The apparatus of M, wherein the interface unit includes: an auxiliary power port configured to receive the DC power unit; a first connector configured to electrically connect to the donor battery-powered vehicle; a second connector configured to electrically connect to the receiver battery-powered vehicle; and DC-to-DC circuit components configured to connect to the first and second connectors and the DC power unit.

P. The apparatus of O, wherein the DC-to-DC circuit components include: a controller; a donor communication device being configured to communicate with the donor battery powered vehicle via the first connector; and a receiver communication device being configured to communicate with the receiver battery powered vehicle via the second connector.

Q. The apparatus of P, wherein: the interface unit includes: a first component configured to convert a voltage supplied by the DC power unit into an operational voltage for the controller, the donor communication device and the receiver communication device; and a second component configured to convert the voltage supplied by the DC power unit into a pre-charge value for the DC-to-DC circuit components; and the controller is configured to: receive a pre-charge signal from a vehicle chosen from the donor battery-powered vehicle and the receiver battery-powered vehicle via the communication devices; and in response to receiving the pre-charge signal: command the second component to convert the voltage supplied by the DC power unit into the pre-charge value for the DC-to-DC circuit components; and command the first component to stop conversion of the voltage supplied by the DC power unit into the operational voltage.

R. A method comprising: inserting DC power device into a vehicle-to-load recharging unit; connecting the vehicle-to-load recharging unit to a donor vehicle and a recipient load device; converting voltage from of the multi-function DC power device to an operational voltage; and supplying the operational voltage to a controller of the vehicle-to-load recharging unit.

S. The method of R, further comprising: in response to receiving a predefined event: converting the voltage supplied by the multi-function DC power device into a pre-charge value; pre-charging the DC-to-DC electronics using the pre-charge voltage; and stop supplying the operational voltage to the controller.

T. The method of S, further comprising: receiving an instruction from a device chosen from the donor vehicle and the recipient load device, the instruction includes instructions to discontinue pre-charging and begin active charging.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

For example, a central processing unit of a personal computer may, at various times, operate as a module for displaying graphics on a screen, a module for writing data to a storage medium, a module for receiving user input, and a module for multiplying two large prime numbers, by configuring its logical gates in accordance with its instructions. Such reconfiguration may be invisible to the naked eye, and in some embodiments may include activation, deactivation, and/or re-routing of various portions of the component, e.g., switches, logic gates, inputs, and/or outputs. Thus, in the examples found in the foregoing/following disclosure, if an example includes or recites multiple modules, the example includes the possibility that the same hardware may implement more than one of the recited modules, either contemporaneously or at discrete times or timings. The implementation of multiple modules, whether using more components, fewer components, or the same number of components as the number of modules, is merely an implementation choice and does not generally affect the operation of the modules themselves. Accordingly, it should be understood that any recitation of multiple discrete modules in this disclosure includes implementations of those modules as any number of underlying components, including, but not limited to, a single component that reconfigures itself over time to carry out the functions of multiple modules, and/or multiple components that similarly reconfigure, and/or special purpose reconfigurable components.

In some instances, one or more components may be referred to herein as "configured to," "configured by," "configurable to," "operable/operative to," "adapted/adaptable," "able to," "conformable/conformed to," etc. Those skilled in the art will recognize that such terms (for example "configured to") generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (for example, "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (for example, the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software (e.g., a high-level computer program serving as a hardware specification), firmware, or virtually any combination thereof, limited to patentable subject matter under 35 U.S.C. 101. In an embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, limited to patentable subject matter under 35 U.S.C. 101, and that designing the circuitry and/or writing the code for the software (e.g., a high-level computer program serving as a hardware specification) and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

With respect to the appended claims, those skilled in the art will appreciate that recited operations therein may generally be performed in any order. Also, although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While the disclosed subject matter has been described in terms of illustrative embodiments, it will be understood by those skilled in the art that various modifications can be made thereto without departing from the scope of the claimed subject matter as set forth in the claims.

What is claimed is:

1. An apparatus comprising:
a multi-function DC power unit comprising a rechargeable battery and a load; and
an interface unit configured to perform battery recharging between a donor battery-powered device and a receiver battery-powered device, the interface unit comprising an auxiliary power device port configured to receive the multi-function DC power unit;
wherein the multi-function DC power unit is further configured to be received within and receive a charge from a recharging component included in a device chosen from the donor battery-powered device and the receiver battery-powered device when removed from the auxiliary power device port of the interface unit.

2. The apparatus of claim 1, wherein the multi-function DC power unit is further configured to be handheld.

3. The apparatus of claim 2, wherein the load of the multi-function DC power unit includes an illumination device.

4. The apparatus of claim 1, wherein the interface unit includes:
a first connector configured to electrically connect to the donor battery-powered device;
a second connector configured to electrically connect to the receiver battery-powered device; and
DC-to-DC circuit components configured to connect to the first and second connectors and the multi-function DC power unit.

5. The apparatus of claim 4, wherein the DC-to-DC circuit components include:
a controller;
a donor communication device being configured to communicate with the donor battery-powered device via the first connector; and
a receiver communication device being configured to communicate with the receiver battery-powered device via the second connector.

6. The apparatus of claim 5, wherein the interface unit includes:
a first component configured to convert a voltage supplied by the multi-function DC power unit into an operational voltage for the controller, the donor communication device and the receiver communication device; and
a second component configured to convert the voltage supplied by the multi-function DC power unit into a pre-charge value for the DC-to-DC circuit components.

7. The apparatus of claim 6, wherein the controller is configured to:
receive a pre-charge signal from a device chosen from the donor battery-powered device and the receiver battery-powered device via the communication devices; and
in response to receiving the pre-charge signal:
command the second component to convert the voltage supplied by the multi-function DC power unit into the pre-charge value for the DC-to-DC circuit components; and
command the first component to stop conversion of the voltage supplied by the multi-function DC power unit into the operational voltage.

8. An apparatus comprising:
a charging interface unit configured to perform battery charging between a donor battery-powered device and a receiver battery-powered device, the charging interface unit comprising an auxiliary power device port configured to receive a DC power unit comprising a rechargeable battery and a load to power the charging interface unit;
wherein the DC power unit is configured to be received within and receive a charge from a recharging component included in a device chosen from the donor battery-powered device and the receiver battery-powered device when removed from the auxiliary power device port of the charging interface unit.

9. The apparatus of claim 8, wherein the donor battery-powered device and the receiver battery-powered device are vehicles.

10. The apparatus of claim 9, wherein the load of the DC power unit includes an illumination device.

11. The apparatus of claim 9, wherein the interface unit includes:
a first connector configured to electrically connect to the donor battery-powered vehicle;
a second connector configured to electrically connect to the receiver battery-powered vehicle; and
DC-to-DC circuit components configured to connect to the first and second connectors and the DC power unit.

12. The apparatus of claim 11, wherein the DC-to-DC circuit components include:
a controller;
a donor communication device being configured to communicate with the donor battery-powered vehicle via the first connector; and
a receiver communication device being configured to communicate with the receiver battery-powered vehicle via the second connector.

13. The apparatus of claim 12, wherein:
the interface unit includes:
a first component configured to convert a voltage supplied by the DC power unit into an operational voltage for the controller, the donor communication device and the receiver communication device; and
a second component configured to convert the voltage supplied by the DC power unit into a pre-charge value for the DC-to-DC circuit components; and the controller is configured to:
receive a pre-charge signal from a vehicle chosen from the donor battery-powered vehicle and the receiver battery-powered vehicle via the communication devices; and
in response to receiving the pre-charge signal:
command the second component to convert the voltage supplied by the DC power unit into the pre-charge value for the DC-to-DC circuit components; and
command the first component to stop conversion of the voltage supplied by the DC power unit into the operational voltage.

14. A method comprising:
removing a multi-function DC power device comprising a rechargeable battery and a load from a recharging component included in a device chosen from a donor vehicle and a recipient load device;

inserting the multi-function DC power device into an auxiliary power device port of a vehicle-to-load recharging unit;
connecting the vehicle-to-load recharging unit to the donor vehicle and the recipient load device;
converting voltage from of the multi-function DC power device to an operational voltage; and
supplying the operational voltage to a controller of the vehicle-to-load recharging unit.

15. The method of claim 14, further comprising:
in response to receiving a predefined event:
   converting the voltage supplied by the multi-function DC power device into a pre-charge value;
   pre-charging the DC-to-DC electronics using the pre-charge voltage; and
   stop supplying the operational voltage to the controller.

16. The method of claim 15, further comprising:
receiving an instruction from a device chosen from the donor vehicle and the recipient load device, the instruction includes instructions to discontinue pre-charging and begin active charging.

\* \* \* \* \*